Aug. 26, 1941.  O. F. CARLSON  2,253,930
PRESSURE AND TEMPERATURE RELIEF VALVE
Filed July 11, 1940   3 Sheets-Sheet 2

Inventor:
Oscar F. Carlson
By [signature] Attys

Aug. 26, 1941.   O. F. CARLSON   2,253,930
PRESSURE AND TEMPERATURE RELIEF VALVE
Filed July 11, 1940   3 Sheets-Sheet 3

Inventor:
Oscar F. Carlson
By Brown Jackson Boettcher Dienner
Attys.

Patented Aug. 26, 1941

2,253,930

UNITED STATES PATENT OFFICE 2,253,930

PRESSURE AND TEMPERATURE RELIEF VALVE

Oscar F. Carlson, Kenilworth, Ill., assignor of one-half to Oscar F. Carlson Company, Chicago, Ill., a corporation of Illinois, and one-half to Everett N. McDonnell, Chicago, Ill.

Application July 11, 1940, Serial No. 344,887

11 Claims. (Cl. 137—53)

This invention relates generally to relief valves, and more particularly to valves which are pressure and temperature responsive.

The general object of this invention is to provide a quick-acting valve, responsive to predetermined conditions of pressure and temperatures, and which has a positive open and shut snap action. Such valves are required upon water heating systems and closed space heating systems to avoid possible damage or injury to property and persons from excessive pressures which might otherwise be generated in the system. Causes of excessive pressure in such systems are generally excessive heat input. Thus, for example, assume a domestic hot water heater is being fired to provide a supply of hot water. If the fire is allowed to continue after the water in the tank has become heated to the desired temperature it continues the heat input and presently the temperature will reach the boiling point for the pressure under which the tank is operating and then the pressure will begin to rise as steam is formed and tends to occupy a part of the closed space.

Such a condition is dangerous because the pressure might cause an explosion or other damage and the excessive temperature might injure some one.

A relief valve to have any real value must primarily be reliable and must open at the pressure for which it is set. I have made tests of various devices upon the market and find that they are not only unreliable in that they fail to open at the setting but that they begin to leak when the critical pressure is approached.

Now the problem of providing a reliable and accurate pressure relief valve has been solved in the structure disclosed in my copending application, Serial No. 248,978, filed January 3, 1939, now Patent No. 2,248,807, granted July 8, 1941. An adequate pressure relief valve must not only open when the predetermined pressure has been attained but it must open wide enough to permit the outflow of fluid—water and/or steam—bearing heat, at such a rate that the loss of heat from such outflow is faster than the input of heat by the burner. If this be not the case the pressure may rise from the continued excess of heat input over loss and then the boiler may blow up.

If the relief valve opens it is primarily because of excessive heat input and therefore it may be assumed that heat is being accumulated and the only safe thing for the relief valve to do is to blow the pressure down to a safe temperature.

In other words, assume that a hot water boiler is being over fired to the point that the valve opens. Now the function of a pressure relief valve primarily is to let pressure in excess of a predetermined value escape but the valve should retain all the fluid pressure below the predetermined excess value. But when the excess pressure is produced by heat input the valve should be opened promptly and it is unsafe to close the valve again unless and until the temperature in the closed system has dropped to a predetermined low value which value will be so low as to be safe under all conditions of firing or to indicate that firing has actually been discontinued.

In brief, a pressure relief valve on this service usually opens from pressure due to heat input. The attainment of excessive pressure (as accurately determined by a reliable responsive device) is an indication of a dangerous heat input. Therefore the valve should according to the concept of the present invention open as soon as a dangerous pressure-temperature condition appears and should not be allowed to close upon the usual blow down differential but should be kept open until the temperature has been brought down to a safe value regardless of pressure conditions.

My present invention aims to provide a valve which will attain that end.

Now it is old to have a valve opened by the combined or individual effort of pressure sensitive means and temperature sensitive means. I have shown broadly that combination in my aforesaid copending application, and broadly it is the object of many other devices. Such a device, however, operates quite differently in that the opening of the valve may occur from either pressure or temperature or from both, and it is not possible in those devices to have an accurate pressure response and retain the valve open until a temperature definitely and substantially below the temperature corresponding to pressure at which the valve should close, has been reached.

According to my invention the valve is made to open accurately and positively, without leakage, dribbling or variation, at a definite value of pressure (as produced by temperature). If the pressure should be due to causes other than excessive temperature the valve opens and blows down the desired differential and then closes, for there is no need to waste liquid if the cause of opening is pressure only and that pressure has subsided. But according to my invention, if the pressure is due to excessive heat input, the valve will open precisely at its predetermined setting and release the pressure and then will not close again until the temperature has dropped to a value which shows that a condition has been reached that cannot do injury from either temperature or pressure.

The valve of my invention opens not from temperature alone, but from pressure alone or from pressure due to temperature, and if temperature above normal is detected then the valve will not close until the undesirable temperature has been gotten rid of.

With the devices in use at the present time there is a tendency to dribble at the junction of the valve seat and valve member without the valves either opening or shutting in a positive and firm manner. This is due to the pressure building up to an amount slightly greater than the predetermined setting whereupon the valve member rises, not completely, but only minutely, from the valve seat and frees a small amount of steam. Due to the rate of heat input in the boiler to be controlled, this pressure which raises the valve member slightly is often not great enough to force the valve member fully open, but yet is sufficient to keep the valve from reclosing. This intermediate stage in the opening of the valve then permits a constant leakage and dribbling. Another common fault of the present day valves is that in addition to the dribbling there is a tendency to "pop." That is, the temperature builds up in excess of the predetermined setting and the valve, which is the ordinary spring-loaded type, is opened, whereupon pressure is released and the valve springs shut. A moment later it pops open, and again quickly pops shut. There is not a sufficient sustained release; this results in a constant popping open and shut.

These faults of dribbling and popping are common not only to pressure relief valves, but also to temperature relief valves or such valves as are a combined form of temperature and pressure relief valves.

To overcome these difficulties, I provide in this invention biasing means for holding the valve member tightly upon the valve seat by a force greater than the pressure produced within the system and bearing against the valve surface until a critical and predetermined pressure has been reached. At that critical point a portion of the force holding the valve member firmly seated is reversed which causes the valve member to snap away from the valve seat into fully open position. The valve remains open, then, until the pressure is released and lowered to the predetermined amount, whereupon the force tending to close the valve overcomes the pressure within the system, and the valve member snaps tightly shut upon its seat. Popping and dribbling is done away with.

This snap action is produced by a cam and roller arrangement, the cam being spring loaded and the roller being borne on the valve member stem. Cam and roller arrangements have been used before, but in all such cases leakage and dribbling have resulted, since the valve stem bearing the roller has had to rise slightly from its seat before sufficient relative motion between the cam and roller has occurred to take the roller over the peak of the cam and open the valve fully. With such an arrangement a tightly seated valve was unobtainable. Additions of temperature relief controls to such devices increased the leakage.

In my present invention a snap action is produced by the use of a cam and roller, but the relative motion between the elements of the snap mechanism is produced by movement of a pressure responsive element, such as a spring loaded expansible bellows. The bellows permits the necessary relative travel between the snap members without allowing any relative motion between the valve and its seat. In fact in the preferred form, the expansion of the bellows increases to some degree the loading of the valve member against the valve seat. In the preferred embodiment of my invention, I mount the valve seat upon the top of the bellows which thereby allows the expansion of the bellows to carry the seat and the valve against the loading spring, while securing the necessary motion of the valve stem which, in turn, carries one element of the snap action. This motion of seat, valve and associated snap element carries that snap element past the crest of the cam of the cooperating element. Thereupon the loading of the snap mechanism, which previously tended to hold the valve firmly against the seat, now raises the valve suddenly from its seat into fully open position. This action allows no dribbling or leaking. When the pressure is sufficiently released, the spring loading of the seat member which pulls the valve stem and head down with it forces it, and the roller it bears, back past the peak of the cam whereupon the spring loaded cam by its additional force snaps the valve firmly back upon its seat.

With this pressure responsive unit, I provide a temperature-responsive relief control. These two units work in conjunction when pressure due to heat input is increasing too rapidly. Should the situation arise where the valve has been snapped open due to excess pressure, and the pressure has been relieved without a proper or predetermined lowering of the temperature, then the temperature control unit will continue to maintain the valve fully open until the heat has been reduced to its predetermined level. Upon the proper reduction in temperature the valve will snap tightly shut. There is no leakage or dribbling.

This temperature-responsive relief control produces the above-mentioned snap action of the valve by changing the relative positions of the aforementioned cam and roller. In the preferred form, the temperature responsive element is a liquid bulb bearing a flexible sealed bellows. On the end of such bellows an arm is borne which, when moved by expansion of the bellows due to increased heat, shifts the cam and its peak. When the temperature and its corresponding pressure is excessive, the peak of the cam is moved down over the roller while the pressure responsive bellows acts to move the roller up over the peak. This means the cam is not stationary in respect to the movement of the roller, but instead moves toward the roller, and thus effects the passage of the roller over the peak. Such passing of the peak of the cam snaps the valve into fully open position.

As the temperature is reduced to its proper and predetermined level, the bellows of the temperature responsive element contracts and the arm it bears forces the cam, with its peak, up and past the roller which is borne on the valve stem. At that moment then, the spring loading of the bellows acting upon the valve stem and head, with this addition of the spring loading on the cam, snaps the valve tightly shut.

Other objects and advantages of the present invention will appear more fully from the following detailed description which, taken in conjunction with the accompanying drawings, will disclose to those skilled in the art the particular construction and operation of a preferred form of the present invention.

The preferred form is not the only form in which may be embodied the broad concept of producing relative motion between the elements of the snap mechanism without producing relative motion between the valve and the seat. The preferred form is advantageous in many ways, but obviously the invention is not limited to the preferred form.

Referring now more particularly to Figures 1 to 4, inclusive, the casing 1 of the pressure and temperature relief valve includes an upper casing portion, or spring housing, 2 and a lower section, or valve housing, 3. The upper and lower portions of the casing are firmly secured together by screws of the type as indicated at reference numeral 6 and between the housings 2 and 3 there is clamped a guide plate 9, a flexible diaphragm 10 and an arresting plate 11 for the spring diaphragm 10.

Figures 1, 7:
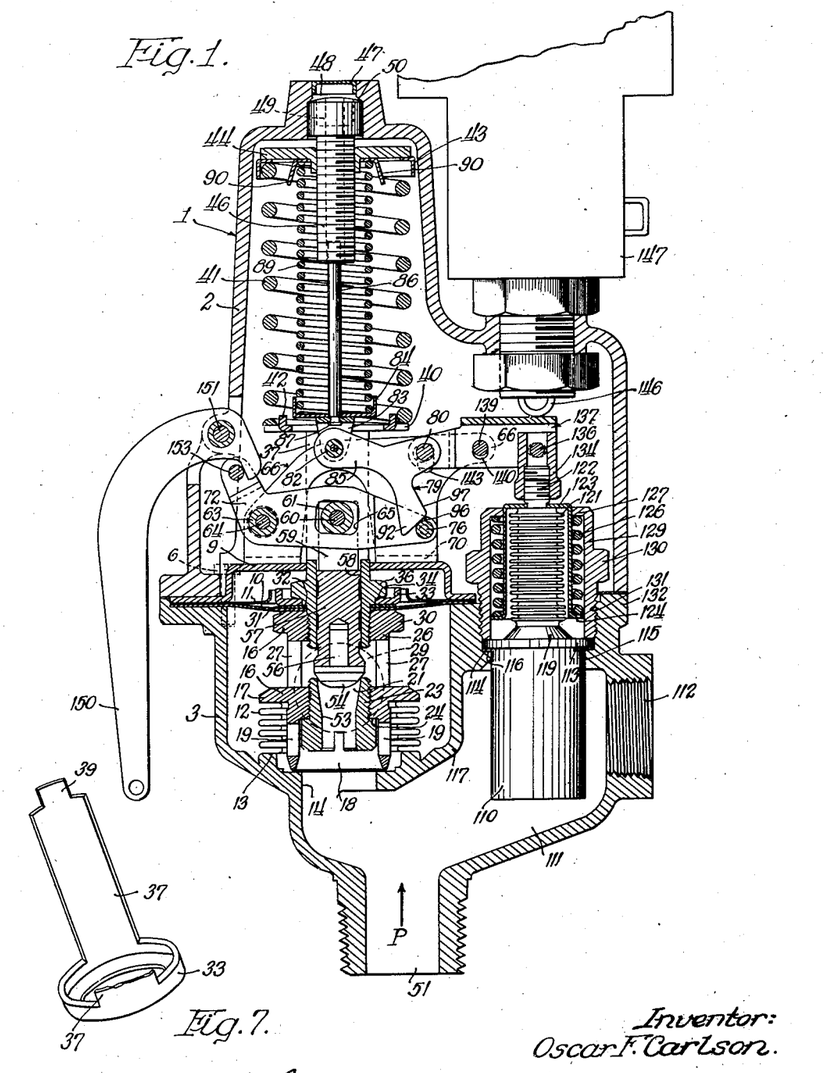
Figure 1 is a longitudinal section taken through a pressure and temperature relief valve with the parts shown in the position they occupy when the valve is closed.
Figure 7 is a fragmentary view of the spring bracket connecting the biasing spring with the shiftable valve seat holder.

A free-floating flexible bellows 12 which is sealed at its lower end to a shoulder 13 as by soldering, around the inlet 14, carries on its upper end a valve seat holder 16. This valve seat holder 16 is cylindrical in form and has a flange 17 to the under side of which is soldered the upper end of the flexible bellows 12. The lower and cylindrical portion 18 of the valve seat holder 16 fits within the flexible bellows and acts as a guide during the free movement of the bellows. Ports 19 in the cylindrical portion 18 of the valve seat holder 16 permit free flow of the gas or liquid, which is under pressure, from the flexible bellows to the outlet 21 of the valve when the valve opens. The upper cylindrical portion 26 of the valve seat holder 16 has ports 27 through which pressure and vapor is released to the outlet 29 at the rear of the assembly when the valve is open. The uppermost portion of this valve seat holder 16 carries a flange 30 which bears tightly against the diaphragm 10 and a washer 31 pressing them against the shoulder 32 and the pan-shaped ring 33 which encircles and bears against the shoulder 34 of the cylindrical guide 36.

This pan-shaped ring has upwardly-extending and separated arms 37 (see Figure 7) which extend from the ring 33 in the lower half of the casing 1 up through the guide plate 9 into the upper half of the casing. The upper portion of the arms 37 are reduced, as at 39, and are inserted into suitably formed slots in a plate 40 serving as a base for a biasing spring 41, the lower end of the latter seating against the plate 40. In order to hold the spring 41 in place on the plate 40, tongues 42 are slit and are bent upwardly from the plate 40 to a distance substantially equal to the diameter of the wire from which the spring 41 is formed. The ends of the arms 37 extend through the plate 40 a similar amount and therefore cooperate with the tongues 42 in maintaining the lower end of the spring in place.

Therefore it may be seen that the effective force of the compressed spring 41 is transmitted to the valve seat holder 16 through the arms 37 and pan-shaped ring 33 and tends to resist movement of the flexible bellows 12 when it is subjected to pressure on its interior.

The upper portion of the spring bears against the plate 43 which in turn fits against the washer 44. The plate 43 has a downwardly extending rim which holds the end of the spring 41 in proper position. The washer 44 is threaded in its center to engage the adjusting screw 46. The adjusting screw 46 is reached by removing the cap 47 from the hole 48 in the top of the casing. When the cap 47 is removed a socket wrench may be inserted into the socket 49 in the head of the adjusting screw 46 which is resting in a suitable recess 50 in the upper portion of the spring housing 2.

The gas or liquid under pressure flowing into this unit through the inlet 51 enters an opening 14 and thence passes into the interior of the flexible bellows and the passageway 53 of the valve seat 23. The pressure acts against the interior of the bellows 12 tending to raise it and acts upon the face of the valve member 54 trying to raise it also. The valve member 54 has a shank 56 which is firmly set in the valve stem 57. The valve stem 57 slides on transverse ribs 58 in the cylindrical guide 36 which is screwed into the upper portion of the valve seat holder 16.

This cylindrical guide 36 has, intermediate its ends, a flange whose shoulders 32 and 34 firmly clamps the ring 33, the washer 31 and the spring diaphragm 10 firmly against the flange 30 of the valve seat holder 16.

Figure 4:
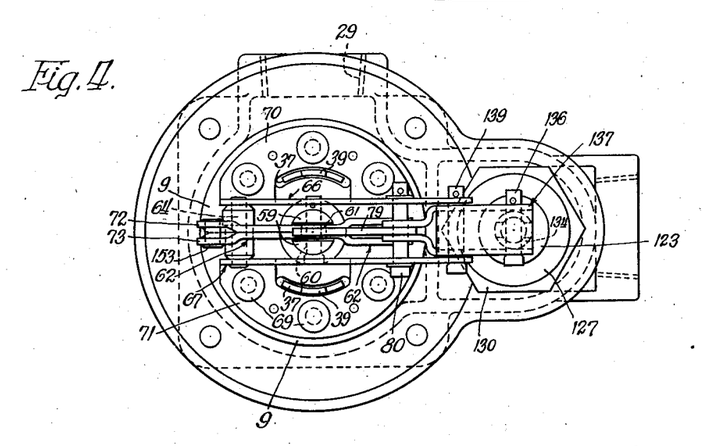
Figure 4 is a plan view with the upper half of the casing, the two springs and the electric switch unit removed.

The upper portion of the valve stem 57 is split into two arms 59 which carry the pin 60 of the sleeve 61 which is borne between the arms 59 on said pin. This sleeve 61 and pin 60 passes through the rocker arm 62 at the elongated slot 65. This rocker arm 62 consists of two bars 72 and 73 (Figure 4) and at the left end the rocker arm 62 is pivoted at 63 about a pin 64 which is carried by the two upright supports which are indicated each in their entirety by the reference numerals 66 and 67 (Figure 4). These supports each have a flange 70 and 71 which are riveted as at 69 to the guide plate 9.

The right hand ends of the bars 72 and 73 are offset and carry a cam roller 76 disposed between them (Figure 1).

A bellcrank detent member 79 in the form of a cam bears against the cam roller 76 and in its apex is pivoted on the pin 80, which is carried by the two supports 66 and 67, and its horizontal arm is pivoted on the pin 82 which is carried by the U-shaped bracket 83. This U-shaped bracket 83 is fastened to the cup 84 by the reduced end of the rod 86 being passed through the elements 83 and 84 and being peaned over as at 87. The rod 86 extends into the internally drilled adjusting screw 46 and acts as a guide for the spring 89 when it is compressed.

The cub 84 holds the lower end of the spring 89 in place while the upper end is positioned by the tangs 90 which are struck down from the plate 43.

The compression of the spring 89 then exerts its force by leverage on the cam member 79 through the pivot pin 82 and the arm 85 thus tending to swing the lower end 92 of the cam member 79 in an arc downward and to the right about pivot pin 80 as a center. Such pivoting of the lower end 92 of the cam member 79 is resisted by the cam roller 76, borne between the two end portions of the rocker arm 62. The compression of the spring 89, then, as may be seen, ultimately transmits its force to the valve stem 57 through the cam member 79, the cam roller 76, the rocker arm 62 which carries the cam roller 76 and thence to the sleeve 61 and the pin 60 which is fastened through the upper end 59 of the valve stem 57.

Such force against the cam roller 76 is transmitted to the rocker arm 62 which carries the roller 76. The rocker arm is therefore pushed downward, about the pin 64 as a center, and acts through the pin 60 against the valve stem 57 since the arms 59 of the valve stem 57 carry the pin 60. As may be seen then, the compressed spring 89 ultimately exerts its force on the valve stem 57 and seats the valve head 54 tightly against the valve seat 23.

Though this valve is a combination pressure and temperature relief valve it will open from pressure alone with the same positive snap action. The snap action of the valve can most easily be explained by a description of the action of pressure alone on the valve, i. e., exclusive of temperature, so I shall first describe such action and will follow with a description of the snap action as controlled by both pressure and temperature. The pressure within the system to be controlled acts upon the valve head 54 and the flexible bellows 12. As previously shown, the compressed spring 41 resists the upward expansion of the bellows, and the compressed spring 89 resists upward movement of the valve head 54 away from the valve seat 23. As the pressure increases, the flexible bellows will expand and move upwardly against the resisting spring 41 thus compressing it. The valve will remain tightly closed for its valve seat is borne upwardly along with the flexible bellows 12 and thus tends to compress the spring 89 even more. As the bellows 12 carries the valve seat, valve head and valve stem up, the rocker arm is forced upwardly too, about the pivot pin 64, and this exerts a force through the cam roller 76 and cam member 79 against the spring 89. The cam roller in being forced upwardly along with the rocker arm 62 not only exerts pressure against the side 96 of the cam arm 92 but also rolls upwardly along the side 98.

So, prior to a critical and predetermined pressure within the unit the spring 89 will press the valve head 54 more and more tightly against the seat 23, until at the predetermined setting the pressure within the unit will have forced the bellows 12, the valve seat 23 and therefore the valve head 54 and stem 57 and rocker arm 62 up to such a point that the cam roller 76 will reach and pass over the peak of the cam to the upper side 97 of the cam arm 92. As the roller 76 passes the peak, it ceases to compress the spring 89 whereupon that spring descends and the cam member 79 swings to the right about the pin 80 and thereby suddenly forces the cam roller 76 up along the cam surface 97. This sudden lift of the rocker arm by means of its roller 76 snaps the valve off its seat into fully open position and releases the pressure within the unit. The valve will never stop on dead center because the internal pressure acting on the face of the valve will throw it upwardly away from its seat as soon as the holding force of the detent is lost. Prior to such snap opening there has been no leakage or dribbling as in other valves. Any gas or liquid that is released passes through the valve throat 53 (see Figure 2) and out its opening 21, then through the ports 27 of the valve seat holder 16, around and back of the valve seat holder 16 to the outlet drain 29 in the back of the unit.

Figure 2:
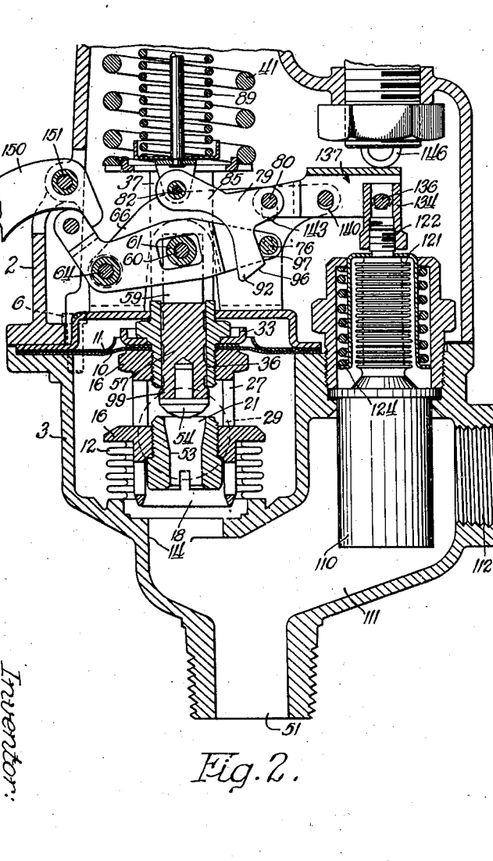
Figure 2 is a longitudinal section similar to Figure 1, but shows the parts in the position they occupy when the valve is open due to excessive pressure alone.
Figure 3:
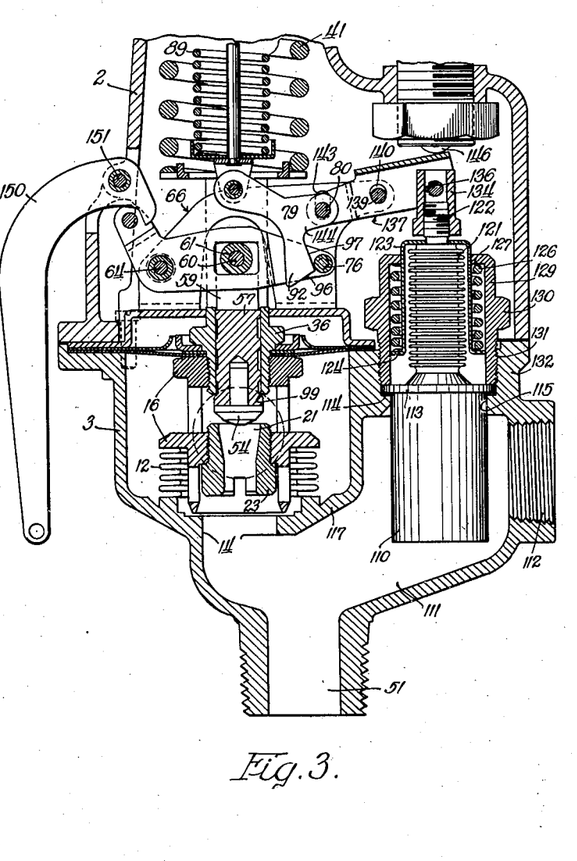
Figure 3 is the same longitudinal section as shown in Figure 1, but indicates the position of the parts when the valve remains open due to excessive heat after pressure has been released.

It should also be noted in Fig. 2 that when the valve head and stem is snapped up, the surface 99 of the valve head 54 completely seals the lower opening of the valve stem guide 36 and prevents any fluid or liquid from passing up through this valve stem guide. This sealing action in conjunction with the diaphragm 10 completely closes off the spring housing 2 from the lower half of the unit, the valve housing 3.

The lift of the rocker arm 62 by the leverage exerted by the spring 89 on the arm 85 of the cam member 79 (when the valve has snapped open) is such that the valve will be kept open until the pressure has been released to a predetermined point. At that time the force of the spring 41 will have overcome the excessive pressure released from within the unit and will collapse the bellows 12, which will draw the valve seat 23, the valve seat holder 16 and the valve stem guide 36 down with it. And the valve stem guide 36 bearing against the surface 99 of the valve head will cause the valve head 54 and stem 57 to come down and pull the rocker arm 62 with them. The descent of the rocker arm due to the force of the spring 41 will overcome the force of the spring 89 against the cam roller 76 and will cause the roller to move along the cam surface 97 to the peak of the cam. When the roller 76 moves toward the peak of the cam it forces the cam member 79 to move toward the left about the pivot pin 80 which compresses the spring 89. This compression of the small spring 89 is not great enough to resist the downward movement of the valve seat holder, valve seat and valve head caused by the larger and stiffer spring 41. When the cam roller 76 passes just beyond the peak of the cam member 79, the compression of the spring 89 will be released and the roller 76 will be suddenly forced down along the under side 96 of the cam 79 as this cam member is swung back to the right by the downward release of the spring 89 which will cause the head 54 to snap tightly shut against the valve seat 23. The snap action is positive and quick and occurs exactly at a predetermined lowering of the pressure, just as the opening of the valve occurs precisely at the predetermined increase of pressure with the same positive snap action.

The above description of the valve's opening and closing by pressure, exclusive of temperature, was for purposes of explaining clearly the snap action of the valve. Such pressure without much heat would be found in a compressed air system or cold water system, for example. But for pressure due to heat a heat control element cooperating with the pressure responsive element is necessary from the point of view of safety, and is the chief object of my invention.

In a system such as a hot water tank installation (Figure 6) or closed hot water boiler installation (Figure 5) the rate of heat input may become too great at some time whereupon excessive pressure may be developed within the storage tank or hot water boiler. Releasing the excess pressure through a safety valve will cut down the immediate danger, but will not always reduce the temperature—and consequently, pressure—to a low enough amount to insure that heat will not be accumulated.

To control such a situation, I provide with the pressure responsive element a heat responsive element which will keep the valve open,—once the combination of pressure and temperature open it,—until the temperature has been reduced to a predetermined value. By this means all pressure and heat are reduced to such an amount that they can not quickly rise to their former dangerous level. There may also be provided in this relief unit a cut-out switch which will shut down the heat supplying means or sound an alarm when the valve is opened.

In such a pressure and temperature relief valve I have provided a bulb 110 which contains a liquid expansible under heat. This bulb 110 is set in an opening 115 in an inner wall 132 of the casing 1 and projects down into the passageway 111 so that the heated liquid or gas in flowing through the inlet 51, passageway 111 and outlet 112 may surround the container. An inner wall 117 of the casing 1 helps form the passageway 111 and separates it from the inlet 14 to the bellows. This bulb 110 has a flange 113 that rests against the washer 114, which washer is carried on the shoulder 116 of the wall 132 of the casing 1. To the neck 119 of the bulb 110 is sealed an expansible bellows 121. The top of the bellows 121 carries a threaded extension 122 which passes through the top of the cover 123. This cover 123 fits over the bellows 121 and has a flange 124 on its lower end, and resting on this flange is a spring 126 which spring loads the bellows 121.

The upper end of the spring 126 rests against the internal shoulder 127 of the cylinder or housing 129. This cylinder carries a hexagonal flange 130 and external threads 131 which are threaded onto the inner wall 132 of the casing 1. When this cylinder 129 is screwed into the internal wall 132 its lower end forces the flange 113 of the bulb 110 against the washer 114 thereby completely sealing off the passageway 111 from the upper half (the spring housing 2) of the casing.

Expansion of the bellows, as the heat input increases above the normal amount, forces up the cover 123. Such upward movement of the bellows 121 and cover 123 is resisted by the spring 126 which is thereby compressed between the shoulder 127 and the flange 124. This flange 124 serves the additional purpose of guiding the expanding bellows in a vertical plane since the flange 124 fits loosely against the inner wall of the cylinder 129.

To the stud 122 of the bellows 121 is threaded a cylindrical member 134 which has a pin 136 inserted through it and also through the arms of the trough-shaped rocker lever 137. The hole in the rocker 137, through which the pin 136 is inserted, is in the form of a slot so that the trough-shaped lever member 137 may pivot freely about the pin 139 when it is raised by the cylinder 134 as the bellows 121 expands. The pin 139 passes through a slot 140 in the middle portion of the rocker lever 137 and is carried at its extremities by the supports 66 and 67. Supports 66 and 67 also bear the pin 80 which passes through an arm of the cam member 79 and through the ends of the rocker 137. There are slots in the left hand ends of the rocker 137 and in the supports 66 and 67 through which pin 80 passes, but there is no slot in the cam member 79 around this pin.

The upward expansion of the bellows 121 (see Figure 3) forces up the rocker arm 137 causing it to pivot first about the pin 80 till the slot 140 has been raised to the under side of the pin 139. At that time the rocker 137 begins to pivot about pin 139. This forces the left end of the rocker 137 to pivot downwardly and slightly to the right carrying the pin 80 and the arm 144 of the cam member 79 along with it. The pin 80 passes along in the slot 143 of the supports 66 and 67. This downward movement of the cam member 79 causes the lower side 96 of the cam to bear against and roll down along the cam roller 76. This downward pressure against the roller 76 keeps the valve head 54 tightly against the valve seat 23. This excess heat input also leads to a rise in pressure which forces up the pressure-responsive bellows 12. As the cam member 79 and its peak are being lowered the expansion of the bellows 12 will push the rocker arm 62 and its cam roller 76 up and past the peak of the cam.

As soon as the upward movement of the cam roller, due to pressure, and the downward movement of the cam peak due to excessive temperature carry the two elements past each other, there is a sudden uplift of the rocker arm as the roller rides up the side 97 of the cam member 79 and the valve snaps completely open. This opening of the valve allows the excessive pressure (in the form of steam and hot water) to escape. As the steam and hot water escape heat is thereby dissipated, at the same time cold water from the water supply means enters the tank or boiler and cools down the unit. As shown in Figure 1, there is an electric switch 147 whose control button 146 is snapped by the top of the rocker 137,—which has been forced up by the expansion of the bellows 121. When the control button 146 is thus raised the switch may be adapted to shut off the heat input or sound an alarm or give some other warning.

When the valve has been opened by this combination of temperature and pressure, the cam 79 will have been lowered so far that even a complete contraction of the pressure responsive bellows, when the pressure is fully released, will not allow the roller 76 to be brought down past the cam 79 if there is excessive heat in the system. (See Figure 3). Such excessive heat without accompanying excessive pressure might result if the water supply means is clogged or shut down so that no cool water can enter the system after the valve opens. Of course, if the cut-off switch 147 is used (though this relief valve would be safe without it) the heat supply will have been shut off, thus stopping heat input and permitting the excessive heat to dissipate more rapidly and at very much the same rate as the pressure is released.

The effect of lowering the pivot pin 80 of the cam lever is to give the spring 89 a greater leverage with respect to the roller 76 hence the main spring acting through the lever 62 and roller 76 will not be able to close the valve until the temperature drops and the leverage changes and the cam rises.

As the excessive heat is liberated and the system begins to cool down toward a predetermined setting, the fluid in the bellows 121 will start to contract and the spring 126 will begin to collapse the bellows which movement will pull down the right hand side of the rocker arm 137 and thus raise the cam member 79. This will both change the leverage and cause the peak of the cam to rise and pass the cam roller, whereupon the underside 96 of the cam member 79 will bear down on the roller 76 due to the pressure of the spring 89 on the arm 85, and the valve will snap tightly shut, ready for later use. At this time also the electric switch 147 can be adapted to reclose the control circuit of the heat supplying means.

As described above the temperature control element does not act like the present day valves which will open from heat alone and cause dribbling. It is adapted to keep the valve open after the valve has been snapped fully open by a combination of temperature and pressure, but it will not open the valve due to heat alone.

Should the attendant or inspector desire to see whether the valve is operating freely in its guide or to test the valve for any purpose he need but pull the handle 150 (Figure 1) to the left. This handle is pivoted in the casing 1 on a pin 151. As the handle 150 is pulled to the left the claw 152 at the opposite end of the handle 150 engages the pin 153, disposed between the separated ends of the bars 72 and 73 (Figures 1 and 4), and causes the rocker arm 62 to pivot about the pin 64 thus raising the valve stem 57 in its guide and unseating the valve.

Referring to Figure 1, the turning of the adjusting screw 46 will compress both the larger spring 41 and the smaller spring 89 since the washer 44 will be threaded on down the screw 46. Such compression will more heavily load the bellows 12. At the same time the spring 89 will more tightly force the valve head 54 against the seat 23, though the additional force, due to the compression of the spring 89, will not be as greatly increased as the force due to compression of spring 41 since the spring 89 has more turns and a smaller cross-section than spring 41. Consequently, the valve will not be opened until a greater pressure than before has been built up within the unit to raise the bellows 12 against the spring 41 and thus snap open the valve. The compression of the smaller spring 41 increases the differential.

When this increased pressure is formed it will be formed with a corresponding increased temperature. This increased temperature will cause the liquid in the bulb 110 to expand more than it did for the previous setting. Consequently, the cam member 79 will tend to be lowered more than before. However, the construction of the cam 79 and heat responsive element and the length of the slot 143 is such that the cam will never be lowered enough to snap the valve open from heat alone. Therefore, though the cam and its peak will have been lowered slightly, so that the roller 76 will not need to rise quite as far as before to snap past the cam, yet such movement of the roller, remember, is not had until the now more heavily loaded bellows 12 rises from the increased pressure within the unit.

It is to be observed that when the thermostat expands to the extent of lowering the pin 80 down in the slot 143 this has several effects: First, lowering of the pin 80 reduces the compression of the snap action loading spring but this has no substantial effect because of the length and small diameter wire of the spring. Second, the lowering of the pin 80 due to temperature places the peak of the cam at a different point on the arc of the movement of the roller 76 so that the effective inclination of the upper cam surface is changed, making it more difficult for the roller to descend once it is raised. This is apparent because the roller 76 being mounted on the end of the arm 62 moves in an arc. The roller 76 normally, when temperature does not cause shifting of the pin 80, lies slightly below horizontal and on passing the crest of the cam passes slightly above horizontal. Since the distance that the valve 54 moves in snapping away from its seat is always the same, it can be seen that lowering of the pin 80 carries the peak of the cam down. Hence the upper sloping surface of the cam is set not so nearly tangent to the arc of movement of the roller but in effect more nearly transverse to the same, producing a greater retarding effect. The retarding effect may be increased by other means.

Under the ordinary situation where excessive temperature and pressure have opened the valve the operator may desire to have the valve remain open until the temperature has lowered even more than it does for the present setting. That may be accomplished by removing the pin 136 which passes through the cylinder 134 and the rocker 137. With the pin removed, the cylinder 134 may be turned and threaded upwardly on the threaded extension 122 of the bellows 121. The pin 136 is then re-inserted through the cylinder 134 and the rocker 137. The rocker, as it has its right end raised by the manual raising of the cylinder 134, pivots about the pin 80, for the pin 139 in the middle of the rocker 137 is free to move in the slot 140.

At no time can the manual adjustment result in such a movement of the rocker 137 as to allow the cam member 79 to be lowered enough to open the valve from heat alone. If the operator desires the valve to reclose at a higher temperature than previously, after it has been opened by a combination of temperature and pressure, he need but thread the cylinder down in the opposite direction.

Figure 5:
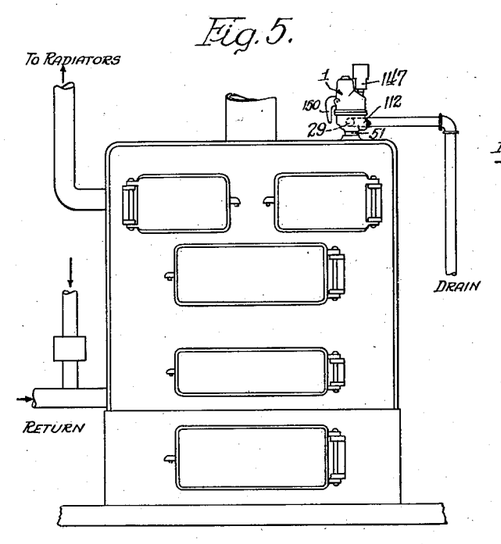
Figure 5 shows the pressure and temperature relief valve as applied to a heating plant boiler with circulation of the fluid through the pipe outlet as indicated by direction of the arrows.

Figure 5 shows hot water circulation in a heating plant boiler. The outlet 112 (Figure 1) is closed tightly by a plug inasmuch as the outlet 112 is for optional use in a domestic hot water supplying unit or other small unit where the discharge is not so great as is needed in a heating plant boiler.

Figure 6:
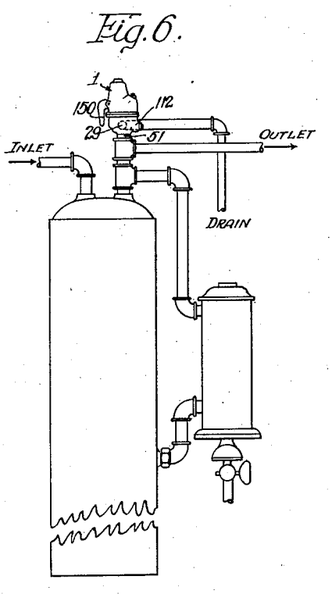
Figure 6 shows the pressure and temperature relief valve as applied to a hot water supplying unit and using a T-joint and pipe for circulation of the fluid (circulation indicated by the arrows) instead of circulation through the optional outlet as built in the valve itself.

Figure 6 shows hot water circulation in a hot supplying unit that is not through the passageway 111 and outlet 112 (Figure 1), but is through a T-joint and outlet pipe connected thereto. The relief unit is screwed into the top of the T-joint and its optional outlet 112 is then closed tightly with a plug. Should circulation through the relief unit itself be desired then the T-joint and its outlet pipe are removed, the plug in the outlet 112 is replaced by the outlet pipe and circulation is through the passageway 111 and outlet 112 (Figure 1).

While I have shown and described above the preferred structure in which the principles of the present invention have been embodied, it is to be understood that my invention is not to be limited to the specific details shown and described above, but that, in fact, widely different means may be employed in the practice of the broader aspects of my invention.

What I claim, therefore, and desire to secure by Letters Patent is:

1. In a relief valve, a casing with an inlet, an expansible bellows communicating with the casing, a valve seat carried by the bellows, a loading spring for the bellows, a valve for engaging the seat, a roller movable with the valve, a spring loaded cam cooperating with the roller, said cam having a double inclined surface for exerting a pressure on one side of the roller to open the valve and on the other side of the roller for closing the valve, and temperature controlled means for causing the cam to hold the valve open until the temperature of the fluid in the casing has been reduced to a predetermined value.

2. A pressure and temperature relief valve comprising, in combination, a valve seat, a valve seating thereupon, a pressure responsive element subject to the same pressure as the valve, a temperature responsive element subject to the temperature of the fluid acting upon said pressure responsive element, a snap mechanism comprising a cam member and a roller member, one of said members being carried by the valve, and the other member being movable by the temperature responsive element and having a spring loading which will urge the valve toward or away from its seat in accordance with the relative position of said cam and roller members, said pressure responsive element and said temperature responsive element causing relative motion between said cam member and said roller member, which motion reverses the action of the spring loading on said valve and snaps it away from its seat when the pressure responsive element and the temperature responsive element are subjected to that range of predetermined combinations of pressure and temperature at which the valve is set to open.

3. A pressure and temperature relief valve comprising, in combination, a valve seat, a valve seating thereupon, a pressure responsive element subject to the same pressure as the valve for moving the valve seat and valve together, a temperature responsive element subject to the temperature of the fluid acting on the pressure element, a snap mechanism comprising a double inclined cam member and a roller member, one of said members being carried by the valve, and the other member being carried by the temperature responsive element and having a spring loading which will urge the valve toward or away from its seat in accordance with the relative position of said cam roller members, said pressure responsive element and said temperature responsive element causing relative motion between said cam member and said roller member, to cause the roller to pass from one side of the cam to the other which motion reverses the action of the spring loading on said valve.

4. The combination of claim 2 with means whereby the said temperature responsive element on rise of temperature above a predetermined value changes the position of the cam relative to the roller to keep the said valve fully open when the temperature remains above its lower predetermined setting though the pressure has already been reduced to its lower predetermined setting.

5. A pressure and temperature relief valve comprising, in combination, a valve seat, a valve member seating thereupon, a spring means for loading said valve to keep it tightly seated, a pressure responsive element, said pressure responsive element being spring loaded to resist the internal pressure to be controlled and having said valve seat fixed thereto, a spring loaded temperature responsive element subject to the temperature of the fluid to be controlled, a snap mechanism comprising a cam member and a cam-roller member, one of said snap members being carried by said valve member and the other of said snap members being carried by said temperature responsive element, said first spring acting through said snap mechanism to urge the valve toward or away from its seat in accordance with the relative position of said cam and roller members, said pressure responsive element and said temperature responsive element causing relative motion between said cam and cam-roller members, which motion reverses the action of the spring loading on said valve and snaps it away from its seat when the pressure responsive element and the temperature responsive element are subjected to that range of predetermined combinations of pressure and temperature in which the valve is set to open.

6. A pressure and temperature relief valve comprising, in combination, a valve seat, a valve member seating thereupon, a spring means for loading said valve to keep it tightly seated, a pressure responsive element, said pressure responsive element being spring loaded to resist the internal pressure to be controlled and having said valve seat fixed thereto, a spring loaded temperature responsive element subject to the temperature of the fluid to be controlled, a snap mechanism comprising a cam member and a cam-roller member, one of said snap members being carried by said valve member and the other of said snap members being carried by said temperature responsive element, said first spring acting through said snap mechanism to urge the valve toward or away from its seat in accordance with the relative position of said cam and roller members, said pressure responsive element and said temperature responsive element causing relative motion between said cam and cam-roller members, which motion reverses the action of the spring loading on said valve and snaps it away from its seat when the pressure responsive element and the temperature responsive element are subjected to the range of predetermined combinations of pressure and temperature in which the valve is set to open, and means carried by said pressure responsive element acting upon the valve to shift the roller relative to said cam to snap the valve tightly shut against its seat when said temperature and pressure are reduced to lower predetermined values.

7. In a temperature and pressure relief valve in combination, a valve seat, a valve member seating thereon, spring means for loading said valve member to keep it tightly seated, a pressure responsive expansible bellows, said bellows carrying the said valve seat and being spring loaded to resist expansion of the bellows due to pressure, a temperature responsive element comprising a bulb and attached bellows, said bulb and bellows being filled with a heat-expansible liquid, a spring for loading said bellows, a snap mechanism comprising a cam member and a cam-roller member, one of said cooperating snap members being carried by the valve member and the other being carried by an arm operable by said heat expansible bellows and being loaded by said first named spring in order to urge the valve toward or away from its seat in accordance with the relative position of said cam and roller members, said pressure responsive bellows and said temperature responsive bellows causing the relative motion between said cam and roller members, which motion reverses the action of the spring loading on said valve and snaps it away from its seat when the pressure responsive bellows and the temperature responsive bellows are subjected to that range of predetermined combinations of pressure and temperature at which the valve is set to open.

8. The combination of claim 7 with means whereby the said temperature responsive bellows on rise of temperature above a predetermined value changes the effective position of the cam relative to the roller to keep the said valve fully open when the temperature remains above its predetermined setting though the pressure has already been reduced to its lower predetermined setting.

9. A temperature and pressure relief valve comprising, in combination, a casing composed of an upper and lower portion, an inlet in said casing, a valve seat, a valve member seating thereon, a passageway from said inlet, an expansible bellows sealed about the upper end of said passageway and carrying a valve seat holder, said valve seat being disposed within said valve seat holder, a spring reacting between a wall of said casing and said valve seat holder to spring load said expansible bellows, guide means to direct movement of said valve member and to limit the upward motion of said valve member, a guide plate clamped at its edges between the upper and lower portions of said casing and having inserted through its center said guide member, a diaphragm clamped around said guide member and clamped at its center between said guide member and said valve seat holder and at its outer edge between said upper and lower portions of said casing in order to seal said upper portion away from said lower portion, a rocker arm pivoted at its center to the upper end of said valve member and pivoted at its fixed end to a support-bracket and having at its free end a cam roller, a detent member, a loading spring therefor weaker than said first mentioned spring, said detent member bearing a cam which is pressed against said cam roller by the compression of said last mentioned spring, a bulb containing heat expansible fluid subject to the temperature of the fluid acting upon the bellows, a sealed and spring loaded expansible bellows on the upper end of said bulb, said bellows being in the upper portion of said casing and sealed from the lower portion of the casing, an adjustable extension on the upper end of said bellows, a rocker arm pivoted thereto, said rocker arm acting to lower the pivot of the afore-mentioned detent member when the temperature surrounding said bulb increases and causes its bellows to expand, such expansion of the temperature responsive bellows cooperating with the expansion of the pressure responsive bellows to cause relative motion between said cam member and said cam roller, which motion will snap open the valve when the pressure and corresponding temperature are reached at which the valve is designed to open.

10. A temperature and pressure relief valve comprising, in combination, a casing composed of an upper and a lower portion, said upper and lower portions being securely fastened together and clamping between them a spring diaphragm and guide plate to seal the upper portion of said casing from said lower portion, an inlet for said casing and two outlets, one of which outlets permits drainage of the released steam and liquid when the valve opens, the other of which permits circulation through the relief unit of the fluid or liquid to be controlled, two passageways from said common inlet, one of which leads to the circulatory outlet the other of which leads to the valve structure, a pressure-responsive expansible bellows whose lower end is sealed around the top of said last-mentioned passageway and whose upper end is sealed to a valve seat holder, a valve seat fastened in said valve seat holder, a valve member seated firmly on said seat, a valve member guide for controlling and limiting the movement of said valve toward and away from said valve seat, said valve guide passing through the aforementioned guide plate and clamping a spring bracket and the aforementioned spring diaphragm to said valve seat holder by means of a flange on said valve guide, a spring support plate, a spring in the upper portion of said casing reacting between a wall of said casing and said expansible bellows by means of said spring bracket which is clamped to said valve seat holder on its lower end and extends upwardly through said guide plate to said support plate for said spring in order to spring load said expansible bellows, a lever arm pivoted at its center to said valve member and pivoted at its fixed end to a fixed support and carrying at its free end a cam roller, a bulb and attached bellows loaded with a heat-expansible liquid, said bulb projecting into the aforementioned circulatory passage, said bellows projecting into the upper portion of said casing and being sealed from said circulatory passageway, a spring for loading said heat-expansible bellows and resisting its expansion, a rigid extension on said bellows, said extension having a rocker arm pivoted thereto, said rocker arm being pivoted at its center to a fixed support member and engaging at its inner end a detent member, said detent member being spring-loaded and having a cam with a hill which bears against said aforementioned cooperating cam-roller thereby forcing the said lever arm downwardly and the valve member tightly against its seat, a predetermined relative motion of said cam and roller reversing the action of the detent spring to snap the valve open, said relative motion of said cam and roller being produced by expansion of the two spring-loaded expansible bellows, one acting under pressure and the other acting by reason of the temperature of the fluid under pressure.

11. In a relief valve, a spring loaded valve responsive to excessive fluid pressure to open and relieve said pressure, a spring loaded snap mechanism opposing opening of the valve when closed and opposing closing when open, said snap mechanism comprising a hill element and a follower element movable relative to each other for opening and closing said valve with a snap action, a temperature responsive element adapted to be subjected to the temperature of the fluid the pressure of which acts upon the valve, and a connection between said temperature responsive element and one of said other elements for shifting the portion of one of the elements of the snap mechanism relative to the other for holding the valve open until the temperature of the fluid has been reduced to a predetermined value.

OSCAR F. CARLSON.